Nov. 8, 1949  R. T. HUBBARD  2,487,245
LEVEL
Filed Feb. 15, 1947
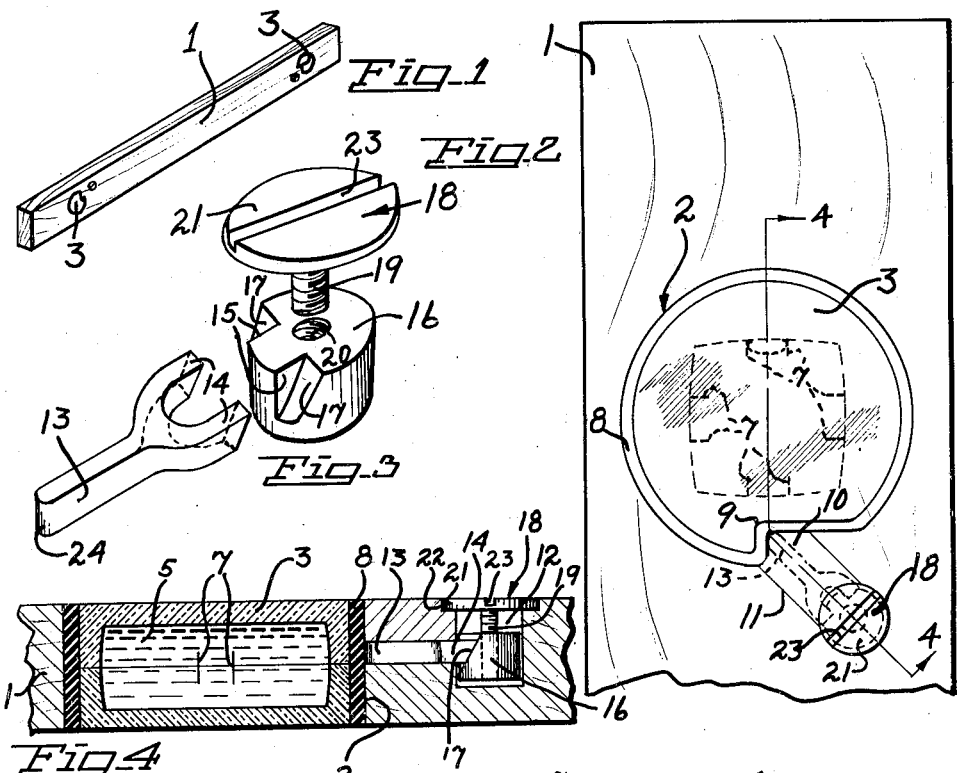
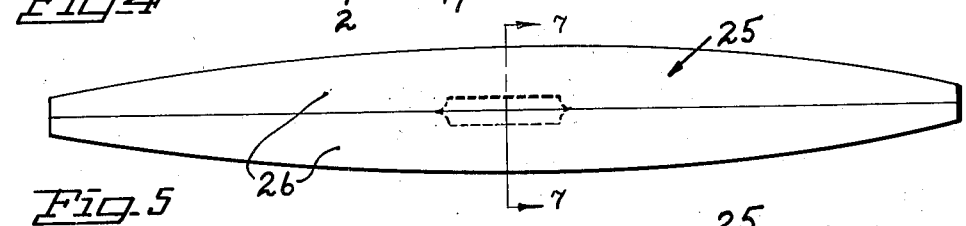
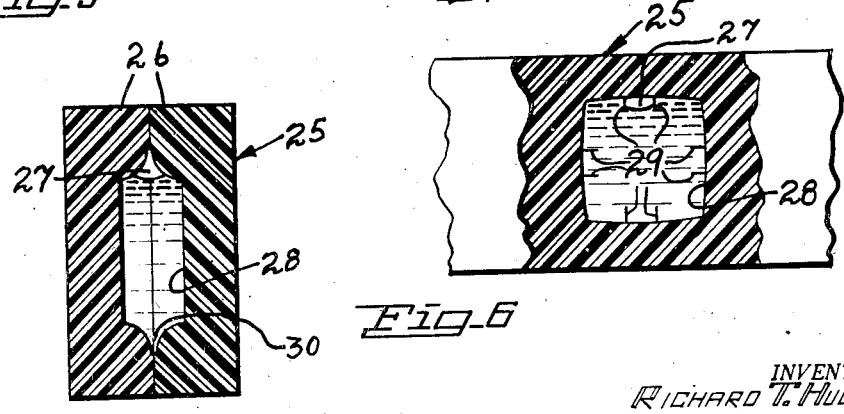
INVENTOR.
RICHARD T. HUBBARD
BY
Glenn L. Fish
ATTORNEY Patented Nov. 8, 1949

2,487,245

UNITED STATES PATENT OFFICE 2,487,245

LEVEL

Richard T. Hubbard, Spokane, Wash.

Application February 15, 1947, Serial No. 728,846

3 Claims. (Cl. 33—214)

This invention relates to a level of the type used by carpenters, bricklayers, and other workmen erecting buildings and other structures which must be kept perpendicularly and horizontally accurate. If such levels are not carefully handled the casings or rings holding bubble glasses are liable to move out of their proper positions and the level will not be accurate.

Therefore one object of the invention is to provide a level having a bubble glass so mounted that it may be turned about its center and thus adjusted by the workman when it is discovered that accurate readings are not obtained by use of the level.

Another object of the invention is to provide the level with a bubble glass so formed that after it has been initially set accurately in the body portion or bar of the level it may be turned to an adjusted position when necessary and so held in the adjusted position that slight jars will not be liable to turn it out of the proper position.

Another object of the invention is to provide a level wherein the circular bubble glass is surrounded by a rubber packing ring and has an offset portion engaged by an adjusting bar which is slidable longitudinally and has abutting engagement with cam surfaces of a block so that when the block is shifted the bar will move longitudinally and the bubble glass moved to an adjusted position.

Another object of the invention is to provide a bar-shifting block which is internally threaded to receive the shank of a screw having its head exposed at a side of the body of the level so that it may be engaged by a screw driver and the screw turned to shift the block longitudinally and thus effect turning adjustment of the bubble glass.

Another object of the invention is to provide a level which is simple in construction and very easy to adjust when necessary.

The invention is illustrated in the accompanying drawings wherein:

Fig. 1 is a perspective view of the improved level.

Fig. 2 is a view upon an enlarged scale looking at one side of an end portion of the level.

Fig. 3 is a group perspective view showing elements of the adjusting means for the level.

Fig. 4 is a sectional view taken along the line 4—4 of Figure 2.

Fig. 5 is a view showing a level of modified construction.

Fig. 6 is a view showing a portion of the modified form of level partially in elevation and partially in section.

Fig. 7 is a sectional view taken along the line 7—7 of Figure 5.

This improved level has the usual body or bar 1 which may be formed of wood or other suitable material and is formed near its ends with openings 2 to receive bubble glasses 3. The bubble glasses are of duplicate construction and each has a substantially circular housing formed of glass, or other suitable transparent material, and consisting of companion sections disposed in face to face engagement with each other where they are secured by cement to form a water tight joint between them. The two sections of the bubble glass are hollowed from their inner surfaces to provide recesses which register and form a pocket or chamber 5 filled with alcohol, or other suitable liquid, and it should be noted that the pocket or chamber 5 is substantially of rectangular shape but has its side walls slightly arcuate longitudinally so that when the level is in use a bubble 6 formed by the liquid may be centered between lines 7 marked upon the side walls of the pocket adjoining the edge walls thereof and thus indicate that a surface being tested is level. A rubber band or packing ring 8 fits tightly about the peripheral wall of the housing of the bubble glass and is glued or cemented to the wall of the opening 2, it being understood that the packing ring or band has gripping engagement with the peripheral wall of the bubble glass. When the level is being assembled the rubber band is thrust into the opening 2 and cemented to the walls thereof and the bubble glass is then forced into place. As the bubble glass is forced into place it has tight compressing fit within the band and the band is compressed and tightly grips the bubble glass about which it fits. Since the rubber band is elastic the bubble glass may have a slight turning movement imparted to it and thereby moved to adjusted positions, the rubber band being distorted circumferentially during this movement. At one point about the circumference of the bubble glass it is formed with a recess 9 having straight walls disposed at right angles to each other and at a corresponding point the opening 2 is formed with a lug or shoulder 10 which also has side faces intersecting at right angles to each other. This lug projects into the opening and fits into the recess 9 and has a portion of the rubber band cemented to it. A diagonally extending opening or passage 11 is formed in the body between the opening 2 and a socket 12 which leads from a side face of the body in spaced parallel relation to the spring 2. This opening 11 extends radially of the socket 12 and has one end communicating with the socket in spaced relation to the bottom or inner end thereof. The other end portion of the opening 11 passes through the lug 10 and communicates with the opening 2 through the two intersecting side faces of the lug. A bar 13 is slidable longitudinally in the opening 11 and at one end is formed with forks or arms 14 which project into the socket 12 and fit into notches or recesses 15 formed in a block 16 with ends of the forks bearing against cam surfaces 17 formed by sloping walls of the recesses. This block fits snugly in the socket but may be slid longitudinally therein axially of the socket and in order to shift the block longitudinally to adjusted positions there has been provided a screw 18 which has its threaded shank 19 screwed into the threaded opening 20 formed through the block axially thereof. The head 21 of the screw is flat and fits into a recess 22 formed about the outer end of the socket 12 so that the outer surface of the screw head is flush with the side face of the body 1 and when a screw driver is engaged in the eye or groove 23 of the screw and the screw turned to draw the block outwardly a cam action takes place between the cam surfaces 17 of the recesses 15 and ends of the forks 14 and the bar 13 will be shifted longitudinally towards the opening 2. As the bar moves longitudinally its rounded end 24 is forced against the rubber band at the junction of the walls of the recess 9 and as this portion of the rubber band is compressed turning movement will be imparted to the bubble glass by pressure applied in the recess 9 and thus cause the bubble and the liquid in the bubble glass to be located between the centering marks 7 when the body of the level is resting upon a surface known to be level. It will thus be seen that when a workman finds that the level is not accurate he can very easily correct the error. When the screw is turned in a direction to shift the block 16 inwardly pressure upon the bar 13 is relieved and resiliency of the elastic band will shift the bar towards the socket and turn the bubble glass towards its initial position.

In Figures 5, 6 and 7 there has been illustrated a modified construction wherein the body 25 is formed of two sections 26 of molded plastic which is transparent so that a view may be had of a bubble 27 formed by liquid in the chamber 28. This chamber is formed by registering recesses formed in inner side faces of the two sections 26 and corresponds to the chamber 5, and upon referring to Figure 6 it will be seen that this chamber is square in outline and has its walls concaved longitudinally so that when the level is in use the bubble 27 will have a tendency to move to a centered position between the lines 29 marked upon side walls of the chamber and corresponding to the centering lines 7.

It will thus be seen that in both embodiments of the invention the level includes in its construction a square bubble glass chamber having longitudinally concaved edge walls and centering lines upon its side walls. If so desired each of the edge walls may be formed midway its length with a tapered extension 30 located between the centering lines and thus allow an accurate reading of the level to be easily made.

Having thus described the invention, what is claimed is:

1. A level comprising a body formed with a transversely extending circular opening, and with a socket adjacent the opening and a passage extending from the socket to the opening, a portion of the body being extended inwardly of the opening and forming an abutment lug having flat edge faces at right angles to each other, a circular bubble glass fitting into the opening and formed of transparent side sections having inner side faces adhering to each other and formed with registering recesses forming the bubble glass with a chamber of rectangular outline, edge walls of the chamber being concaved longitudinally and side walls of the chamber be marked to form centering lines for a bubble intermediate the length of each edge wall, said bubble glass being formed at a point about its circumference with a recess conforming to the contour of the abutment and into which the abutment extends, a rubber ring surrounding the bubble glass, a block in said socket slidable longitudinally therein and having a threaded bore, the block having a side portion facing said passage formed with circumferentially spaced recesses having sloping walls constituting cam surfaces, a pusher bar slidable longitudinally through said passage and having one end rounded and engaging the rubber ring at the junction of walls of the recess in the bubble glass, the other end of said bar having forks bearing against the cam surfaces of said block, and an adjusting screw having a head seated in a recess surrounding the outer end of the socket and a threaded shank engaged in the threaded bore of the block whereby upon turning of the screw in one direction the block will be shifted longitudinally in the socket and the bar shifted longitudinally by cam action and pressure applied to the bubble glass and the bubble glass turned to an adjusted position for centering the bubble between centering lines.

2. A level comprising a body formed with a transversely extending opening and a socket adjacent the opening and a passage extending from the socket to the opening, a circular bubble glass in said opening having a rectangular chamber therein filled with liquid and having side walls marked with centering lines for centering a bubble midway the length of edge walls of the chamber, said bubble glass being formed at a point about its periphery with a recess, the body having an extension constituting an abutment fitting into the recess and through which said passage passes, an elastic binding fitting about the periphery of said bubble glass and into the recess thereof and frictionally gripping the marginal wall of the opening, a block in said socket slidable longitudinally therein and formed with a longitudinally extending cam surface and with a threaded bore, a screw having a head closing the outer end of the socket and a threaded shank engaged in the bore of the block and serving to shift the block longitudinally when the screw is turned, and a bar extending longitudinally through the passage with one end bearing against a portion of the binding in the recess of the bubble glass and its other end bearing against the cam surface of the block whereby longitudinal movement of the block in one direction will shift the bar longitudinally and apply pressure to turn the bubble glass and center a bubble between centering lines of the glass.

3. A level comprising a body formed with a pocket and with a socket connected with a pocket by a passage, a bubble glass mounted in said pocket for turning adjustment and formed with a recess into which an abutment on the body projects, a block shiftable longitudinally in said socket and provided with a longitudinally extending cam surface, a bar slidable longitudinally through the passage with one end engaging in the recess of the bubble glass and its other end bearing against the cam surface of said block, and a screw having threaded engagement with the block and serving to shift the block longitudinally when turned whereby the bar will be shifted longitudinally and the bubble glass turned to an adjusted position for disposing a bubble between centering lines of the bubble glass.

RICHARD T. HUBBARD.

REFERENCES CITED

The following references are of record in the file of this patent:

UNITED STATES PATENTS

| Number | Name | Date |
| --- | --- | --- |
| 915,274 | Day | Mar. 16, 1909 |
| 1,024,831 | Couture | Apr. 30, 1912 |
| 1,057,662 | Otto | Apr. 1, 1913 |
| 1,141,325 | Ewer | June 1, 1915 |
| 1,163,203 | Berkebile | Dec. 7, 1915 |
| 1,260,229 | Marx et al. | Mar. 19, 1918 |
| 1,630,174 | Elas | May 24, 1927 |
| 2,305,678 | Cravaritis et al. | Dec. 22, 1942 |
| 2,317,715 | Ball | Apr. 27, 1943 |